(12) United States Patent
Kelty et al.

(10) Patent No.: US 8,901,885 B2
(45) Date of Patent: Dec. 2, 2014

(54) LOW TEMPERATURE FAST CHARGE

(75) Inventors: Kurt Russell Kelty, Palo Alto, CA (US); Clay Hajime Kishiyama, San Mateo, CA (US); Sarah G. Stewart, San Francisco, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 449 days.

(21) Appl. No.: 13/416,251

(22) Filed: Mar. 9, 2012

(65) Prior Publication Data

US 2013/0234648 A1    Sep. 12, 2013

(51) Int. Cl.
*H01M 10/44* (2006.01)
*H01M 10/46* (2006.01)

(52) U.S. Cl.
USPC .......................................... 320/116; 320/160

(58) Field of Classification Search
USPC .......... 320/107, 116, 118, 119, 125, 150, 160
See application file for complete search history.

(56) References Cited

U.S. PATENT DOCUMENTS

| | | |
|---|---|---|
| 2010/0072954 A1 | 3/2010 | Kohn et al. |
| 2010/0138178 A1 | 6/2010 | Paryani et al. |
| 2011/0012562 A1 | 1/2011 | Paryani |
| 2011/0156641 A1 | 6/2011 | Kishiyama et al. |
| 2011/0156661 A1 | 6/2011 | Mehta et al. |
| 2011/0298417 A1 | 12/2011 | Stewart et al. |

*Primary Examiner* — Edward Tso
(74) *Attorney, Agent, or Firm* — J. Richard Soderberg

(57) ABSTRACT

An automated charge preparation method periodically determines critical parameters for the set of relevant operating conditions, determines whether fast charging is possible, applies fast charging when possible, otherwise applies a dynamically scaled charging rate that is optimized based upon current critical parameters (while optionally heating the individual battery cells as long as fast charging is not available) to reduce/eliminate a risk of lithium-plating.

13 Claims, 3 Drawing Sheets

LOW TEMPERATURE FAST CHARGE

BACKGROUND OF THE INVENTION

The present invention relates generally to charging an energy storage system, and more particularly but not exclusively, to low temperature fast charging of a lithium ion battery cell pack.

Many high-performance energy storage solutions now employ series-connected modules that, in turn, are series and parallel combinations of individual battery cells. Battery packs used with electric vehicles store large amounts of energy in a small space, producing high energy densities. The energy is converted into mechanical energy by the power train to move the vehicle, among other uses.

Low temperature ambient can affect performance of an electric vehicle for several reasons including an adverse effect on the battery cells (e.g., reduction in current carrying capacity for charging and discharging). One such effect is that fast charging at low temperature can, depending upon cell chemistry, result in lithium-plating inside the battery cell. Lithium-plating typically results in an irreversible capacity loss and is avoided whenever possible, particularly for high performance battery packs that can incur significant costs to replace/repair. Different cell manufacturers define "low temperature" differently, dependent upon cell chemistry and application. Low temperature as used herein means less than twenty-five degrees Celsius, and more specifically less than ten degrees Celsius.

In conventional systems where there is risk of lithium-plating, fast charging is disabled for low temperature cells. This can be a disadvantage to the user for several reasons, as well as disadvantageous to the electric vehicle community at large. It is a disadvantage to the user because instances in which a fast charge is necessary or desirable can become easily associated with low temperature ambient conditions. Without fast charge, the user may need to wait until the temperature of the cells rises or initiate slow charging (which can be quite slow, on the order of 0.01C). Availability of low temperature fast charging would allow the user to avoid the consequences of no/slow charging.

It is a disadvantage to the electric vehicle community because public charging stations are often open-air facilities able to serve a particular quantity of vehicles at one time. For users of vehicles in excess of this quantity, waiting in low temperature ambient conditions for an opportunity to begin charging can cause the temperature of the battery cells in the waiting vehicles to fall below a point where fast charging is available. Thus, the users must wait for the cell temperatures to rise, or initiate charging at a slow charging rate. A vehicle using a public charging station in slow-charge mode disadvantages other users, who may have to wait longer. The longer that they wait, they may also find themselves in the same situation where fast charging may become unavailable because the cell temperature in their vehicle has also fallen. Availability of fast charging in such a scenario would improve efficiency and throughput of public charging stations.

What is needed is an apparatus and method for fast charge preparation of low temperature cells potentially at risk of damage from fast charging.

BRIEF SUMMARY OF THE INVENTION

Disclosed is an apparatus and method providing fast charge preparation of low temperature cells. The present invention includes embodiments directed towards automated charge preparation of a plurality of intercoupled energy storage elements that have a risk associated with a fast charging process, under a set of predefined conditions.

An automated charge preparation method for a plurality of intercoupled energy storage elements having a risk responsive to application of a first charging process to the plurality of intercoupled energy storage elements under a set of predefined conditions, includes (a) determining periodically, using a microprocessor, a periodic set of critical parameters for the set of predefined conditions of the plurality of intercoupled energy storage elements; (b) determining periodically, using the microprocessor and responsive to an evaluation of the periodic set of critical parameters, whether the first charging process may be applied to the plurality of intercoupled energy storage elements without the risk; and thereafter (c) charging the plurality of intercoupled energy storage elements using the first charging process whenever the determining step b) determines that the first charging process may be applied to the plurality of intercoupled energy storage elements without the risk; and (d) charging the plurality of intercoupled energy storage elements using a second charging process that may be applied to the plurality of intercoupled energy storage elements without the risk whenever the determining step b) does not determine that the first charging process may be applied to the plurality of intercoupled energy storage elements without the risk; wherein the second charging process has a second energy transfer rate slower than a first energy transfer rate associated with the first charging process; and wherein the second charging process dynamically scales the second energy transfer rate responsive to the periodic set of critical parameters.

An automated charge preparation apparatus charging a plurality of intercoupled energy storage elements having a risk responsive to application of a first charging process to the plurality of intercoupled energy storage elements under a set of predefined conditions includes a critical parameter acquisition system determining a periodic set of critical parameters for the set of predefined conditions of the plurality of intercoupled energy storage elements; a controller evaluating the periodic set of critical parameters and determining, responsive to the evaluation, whether the first charging process may be applied to the plurality of intercoupled energy storage elements without the risk; a charging system, coupled to the plurality of intercoupled energy storage elements, charging the plurality of intercoupled energy storage elements using the first charging process whenever the controller determines that the first charging process may be applied to the plurality of intercoupled energy storage elements without the risk; otherwise charging the plurality of intercoupled energy storage elements using a second charging process that may be applied to the plurality of intercoupled energy storage elements without the risk whenever the controller does not determine that the first charging process may be applied to the plurality of intercoupled energy storage elements without the risk; wherein the second charging process has a second energy transfer rate slower than a first energy transfer rate associated with the first charging process; and wherein the controller dynamically scales the second energy transfer rate responsive to the periodic set of critical parameters.

Features/benefits include an ability to charge under a wider range of temperature conditions, and to prepare low temperature battery cells for fast charging. Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Embodiments of the present invention provide an apparatus and method for fast charge preparation of low temperature cells potentially at risk of damage from fast charging. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
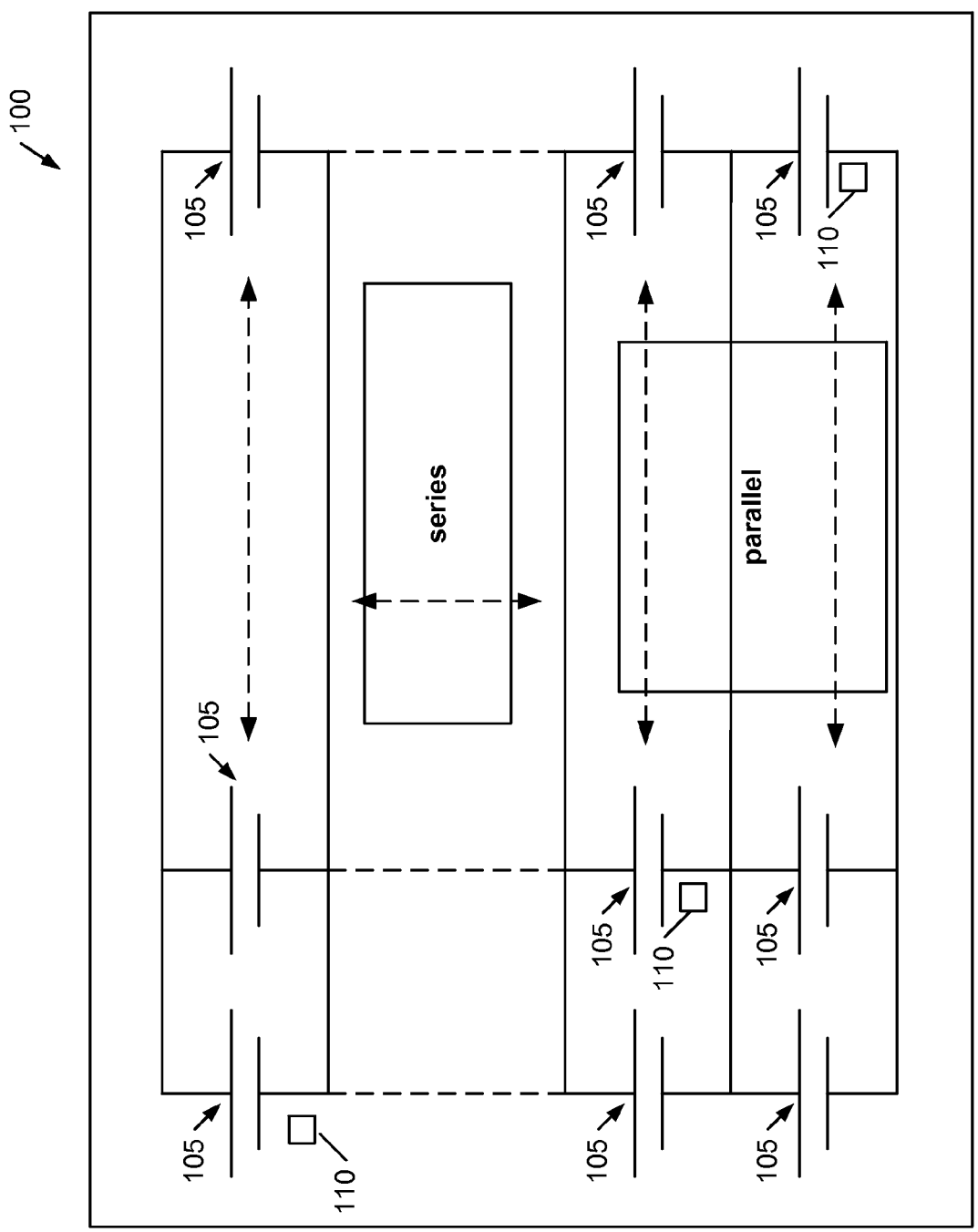
FIG. 1 illustrates an exemplary battery module having a collection of parallel and series connected battery cells.

FIG. 1 illustrates an exemplary battery module 100 having a collection of parallel and series connected battery cells 105. Battery module 100 design may include 10's to 100's to 1,000's of battery cells 105, electrically communicated in parallel and series groupings. Specifics of the installation of battery module 100 and the nature and type of battery cells 105 will influence how many battery cells 105 are grouped in parallel and series. In the preferred embodiment, lithium-ion is used as the battery cell chemistry, the present invention may be applicable to other cell chemistries as well.

Preferred embodiments of the present invention use critical parameters, individually and in the aggregate, to determine whether fast charging of battery cells 105 may impose a risk. For all embodiments, it is not necessary that critical parameters be collected from every battery cell 105 of every battery module 100 of an energy storage system. Depending upon a particular critical parameter to be determined, a sensor, a data acquisition device, or other structure or system, may be coupled to each battery cell 105, to a subset of battery cells 105, or to a single battery cell 105. For temperature sensing for example, one or more battery cells 105 are provided with a temperature sensor 110 (e.g., a thermocouple or the like). Other critical parameters may use other sensors, including other arrangements or configurations.

Different locations within battery module 100 experience different temperatures, therefore the distribution of temperature sensors 110 is designed to improve a probability that the lowest temperature battery cell is known. Knowledge of placement and arrangement of modules within its operating installation (e.g., mounted within a battery pack of an electric vehicle, the battery pack made up of several series-connected battery modules 100) and associated thermal properties can aid in placement of temperature sensors 110.

Figure 2:
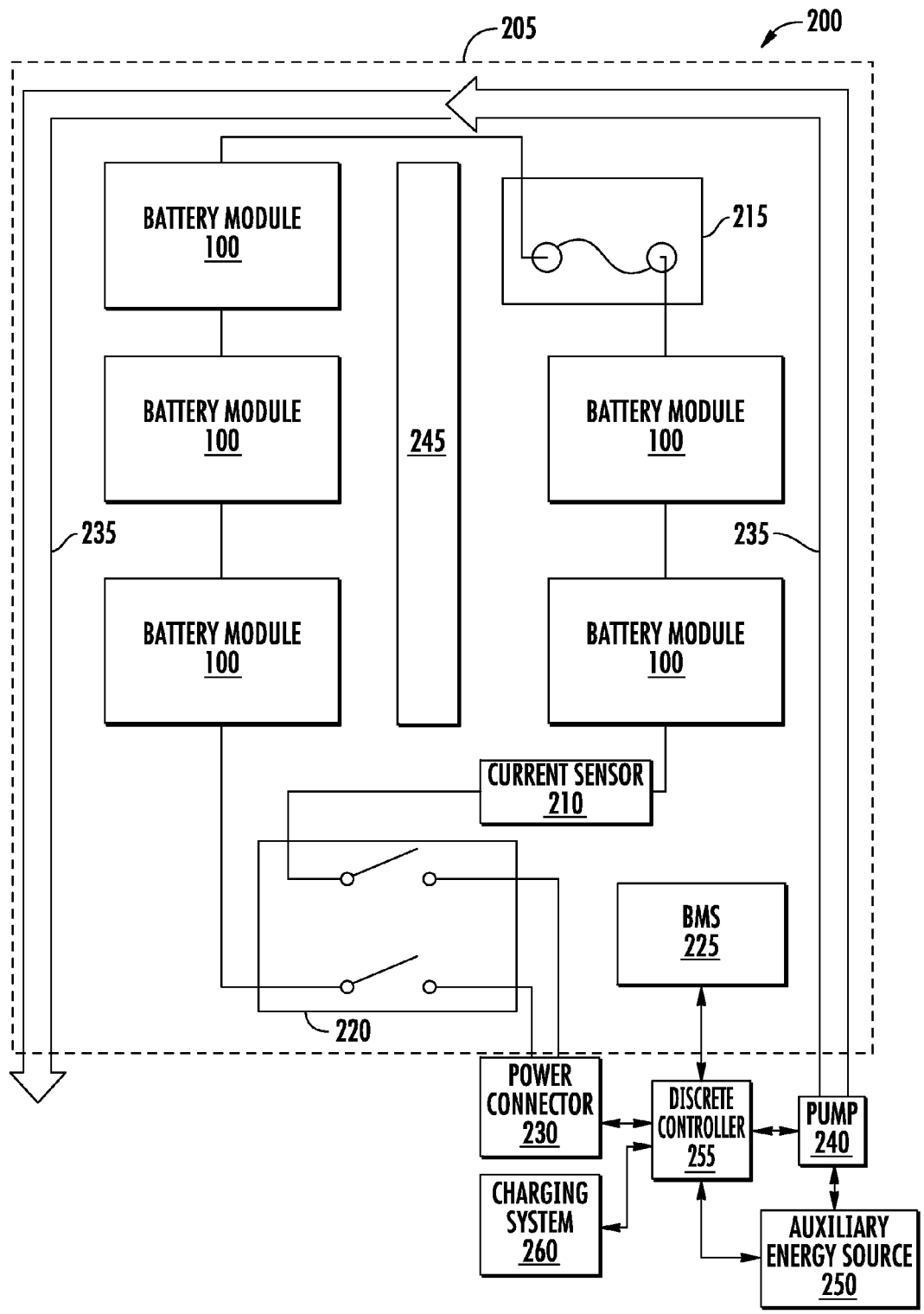
FIG. 2 illustrates a battery pack including a high voltage battery enclosure containing a plurality of battery modules.

FIG. 2 illustrates a battery pack 200 including a high voltage battery enclosure 205 containing a plurality of electrically-serially-coupled battery modules 100 (shown in FIG. 1). Battery pack 200 further includes a current sensor 210, a fuse 215, a set of contactors 220, a battery management system (BMS) 225, and a power connector 230. Enclosure 205 typically provides a structural closed container for battery pack 200 components. Battery pack 200 often includes a temperature control system (generically represented by one or more of (i) a fluid loop 235 and pump 240, and (ii) a pack heater 245) isolated and insulated from the battery pack 200 components and configured to control their temperature. As will be further described herein, pump 240 (or other fluid controller) and pack heater 245 are powered by energy from battery pack 200 or from an auxiliary energy source 250. For ease in explanation, a discrete controller 255 is also shown for interfacing with BMS 225, pump 240, and pack heater 245 to implement and control the modalities of the preferred embodiments as described herein. Controller 255 may be integrated into other control functions in some embodiments. A charging system 260 couples to battery pack 200 for charging as directed by controller 255. Charging system 260 is typically coupled to an external voltage/power source and transfers energy into battery pack 200 for storage, in response to control signals from controller 255.

Battery pack 200 may include any number of battery modules 100 different from the five shown in FIG. 2. Battery modules 100 are serially-coupled inside enclosure 205 with a series path shown in solid lines. In series with serially-coupled battery modules 100 are current sensor 210, fuse 215, and contactors 220. Contactors 220 are switching systems for selectively communicating battery modules 100 to an external load through power connector 230. BMS 225 controls contactors 220 and includes controllers and sensors for measuring and determining desired aggregate critical parameters (e.g., State of Charge (SOC), State of Health (SOH), and other operating characteristics and the like) of battery pack 200. BMS 225 may be coupled to the individual data acquisition systems of battery modules 100 (e.g., temperature sensors 110) as well.

Figure 3:
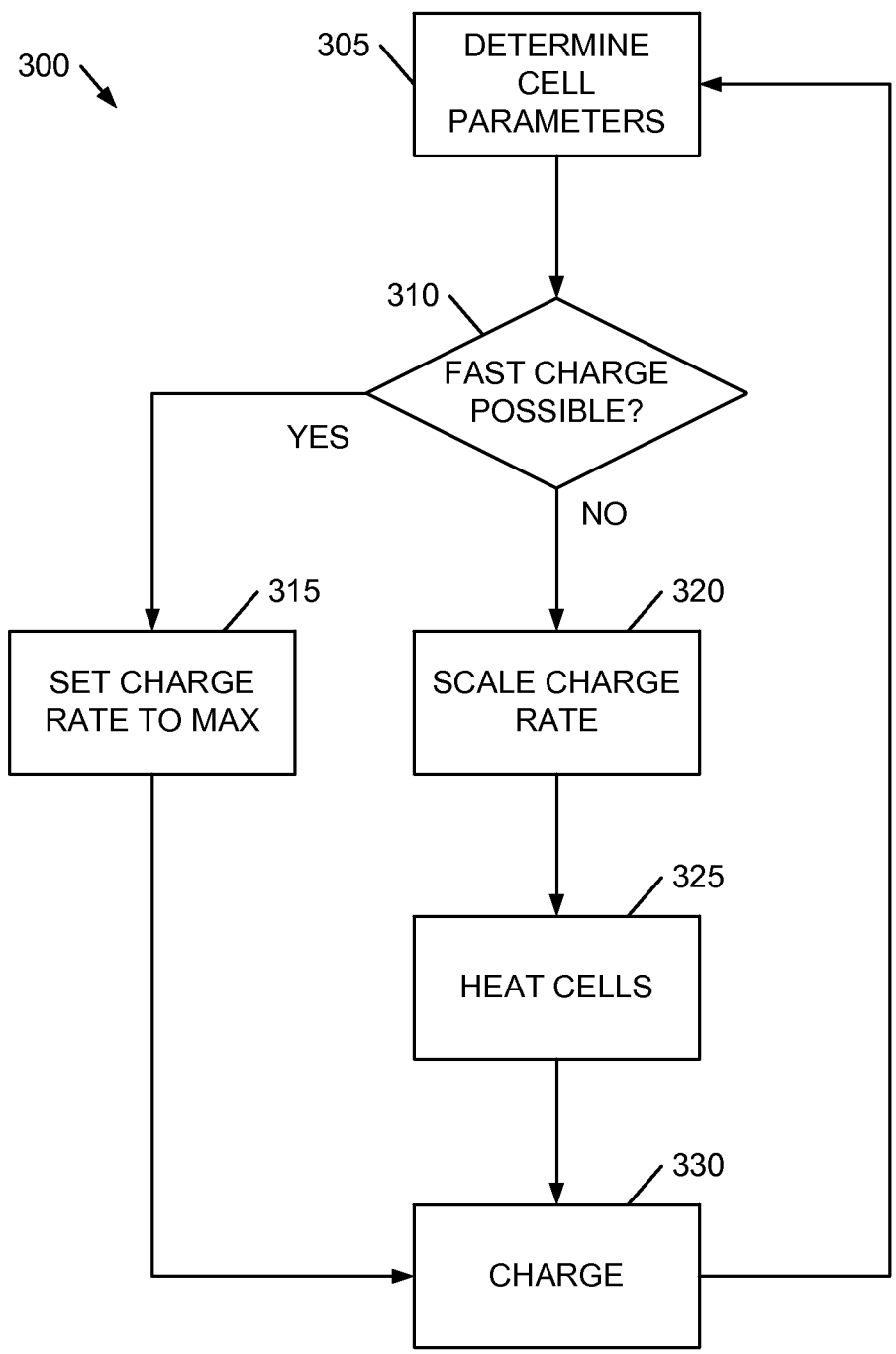
FIG. 3 illustrates a flowchart of a fast charge preparation low temperature process.

FIG. 3 illustrates a flowchart of a fast charge preparation low temperature process 300. Process 300 is a preferred implementation providing fast charge preparation of low temperature battery cells 105. Process 300 is an automated process that determines selective use of one of a "normal" charging profile or a "modified" charging profile based upon whether the normal charging profile incurs too great a risk to the energy storage system.

This determination is based upon a set of predetermined conditions of the energy storage cell. For example, when the normal charging profile is a fast charge (as used herein, fast charge includes energy transfer rates of 1C or greater) for an energy storage system using lithium ion cells. Some such cells are at risk of lithium-plating when fast charged at low temperature. Specifically, this risk is a function of both temperature and state of charge (SOC), and the energy storage system may be characterized by a charging profile or envelope that relates temperature and SOC to an optimized riskless charge rate. That is, for any particular set of critical parameters for the set of operating conditions (e.g., x % SOC and a temperature of y degrees) there is a particular optimized riskless charge rate. This optimized riskless charge rate is a maximum energy transfer rate that does not subject the energy storage elements to more than a predetermined level of damage (e.g., lithium-plating).

Process 300 begins with step 305 to periodically determine sets of critical parameters for the set of operating conditions. With the preferred embodiment in which a lithium-plating risk is present for certain charging levels, the set of operating conditions include SOC and cell temperature. Other implementations may use other operating conditions and/or alternate/additional risks.

Process 300, at step 310, makes an initial determination as to whether fast charging is possible. In one embodiment, this initial determination is accomplished by accessing a lookup table using a most recent set of critical parameters. The lookup table is coupled to controller 255, that may be part of controller 255, and relates specific parameter values for the set of critical parameters to an optimized riskless charge rate. Inherent/implicit in step 310 is discriminating, based upon a current SOC and cell temperature, whether fast charging is possible. When fast charge is possible, process 300 branches to step 315 from step 310 and when fast charge is not possible, process 300 branches to perform step 320 through step 330.

Step 315 sets a charge rate to maximum (i.e., fast charge). Step 320 sets a charge rate to an optimized riskless charge rate appropriate for the most recent set of critical parameters. This optimized riskless charge rate is less than the fast charge rate and may, for some values of SOC and temperature, be as low as 0.01C (and in some temperature/SOC values, the charge rate could be zero). Step 320 dynamically scales the charge rate and, as SOC and/temperature changes, adjusts the charge rate as necessary or desirable.

After step 320, process 300 applies step 325 to heat battery cells 105. Charging heats the individual battery cells and results in changing the current set of critical parameters, which enables, for the same SOC, use of a faster charge rate. For some values of temperature and SOC, the scaled charging rate set by step 320 is at or very near zero. Step 325 may, in such circumstances, be the primary mechanism to change the cell parameters and enable an effective charge rate from step 320. Within well-known limits for "low temperature" charging, charge rate is directly related to temperature and inversely related to SOC.

In some embodiments, faster heating may be desired than that which may be obtained exclusively by exothermic charging rates. In those cases, use of the optional temperature control system is enabled at step 325. For the fluid circulation systems, controller 255 circulates warm/hot fluid in fluid loop 235 to heat individual battery cells 105. For systems including pack heater 245, controller 255 activates pack heater 245 to heat individual battery cells 105. Other temperature control systems may be used in addition, or in lieu of, those described herein.

After both step 315 and step 325, process 300 implements step 330 to apply the appropriate charging rate to the energy storage system. Process 300, after step 330, loops back to step 305 to determine a set of critical parameters. Process 300 periodically loops through step 305-step 330, as appropriate, to continually provide the fastest, least risky, charging rate, and at some point, process 300 performs step 315 to set the fast charge rate.

Process 300 may of course be implemented differently, including a different step sequence or use of different steps. Key features of the preferred implementation of process 300 is periodically determining critical parameters for the set of relevant operating conditions, determining whether fast charging is possible, applying fast charging when possible, otherwise applying a dynamically scaled charging rate that is optimized based upon current critical parameters (while optionally heating the individual battery cells as long as fast charging is not available) to reduce/eliminate a risk of lithium-plating.

Some embodiments of the present invention further refine process 300 by further adjusting charging rates in step 315 and step 320 based upon changes in age and watt-hour throughput and usage of the energy storage system. Watt-hour throughput is related to charge and discharge "cycles." Usage includes but is not limited to how aggressively the car is driven and what temperatures the vehicle is exposed.

As the watt-hour throughput increases over time, or the battery pack ages, or the usage pattern changes, it is a further advantage for some embodiments of the present invention to further adjust the charging rates which makes the charging more optimum. Depending upon how the various charging rates for step 315 and step 320 were implemented, mechanisms for further altering the charging rates employ complementary processes. For example, in some implementations, one or more lookup tables are used to match critical cell parameters to a desired charging rate. Some embodiments may employ a formulaic adjustment to the values accessed from the lookup tables, the formula responsive to the current watt-hour throughput. Other embodiments may employ multiple sets of lookup tables, each set including data for important ranges of watt-hour throughput with each set having charging rates that are, in turn, responsive to the current critical cell parameters. Some embodiments may use a combination of these mechanisms, or some alternate mechanism partially or wholly in lieu of these described mechanisms. For example, as the watt-hour throughput increases, an acceptable charge rate will be reduced at a given temperature and SOC. Aside from the impact of watt-hour throughput, age, and usage, the amount of charge rate reduction over time will also vary depending on the chemistry, design and manufacturing of the cell. For purposes of this application, the watt-hour throughput, age, and usage will collectively be referred to as cell history, with the system dynamically adjusting charging rates using cell history data.

The systems and methods are preferably implemented using a microprocessor executing program instructions from a memory, the instructions causing the apparatus to perform as described herein. The system and methods above has been described in general terms as an aid to understanding details of preferred embodiments of the present invention. In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. An automated charge preparation method for a plurality of intercoupled energy storage elements having a risk responsive to application of a first charging process to the plurality of intercoupled energy storage elements under a set of predefined conditions, the method comprising the steps of:
   (a) determining periodically, using a microprocessor, a periodic set of critical parameters for the set of predefined conditions of the plurality of intercoupled energy storage elements;
   (b) determining periodically, using the microprocessor and responsive to an evaluation of said periodic set of critical parameters, whether the first charging process may be applied to the plurality of intercoupled energy storage elements without the risk; and thereafter
   (c) charging the plurality of intercoupled energy storage elements using the first charging process whenever said determining step b) determines that the first charging process may be applied to the plurality of intercoupled energy storage elements without the risk; and
   (d) charging the plurality of intercoupled energy storage elements using a second charging process that may be applied to the plurality of intercoupled energy storage elements without the risk whenever said determining step b) does not determine that the first charging process may be applied to the plurality of intercoupled energy storage elements without the risk;
   (e) modifying said periodic set of critical parameters to increase said second energy transfer rate by operating on the plurality of energy storage cells during said charging step (d)
   wherein said second charging process has a second energy transfer rate slower than a first energy transfer rate associated with the first charging process; and
   wherein said second charging process dynamically scales said second energy transfer rate responsive to said periodic set of critical parameters.

2. The automated charge preparation method of claim 1 wherein the risk includes lithium-plating and wherein the set of predefined conditions include both a state of charge (SOC) and a temperature of one or more elements of the plurality of energy storage elements.

3. The automated charge preparation method of claim 1 wherein a temperature control system is coupled to the plurality of energy storage elements and wherein said modifying step (e) includes heating the plurality of energy storage elements using said temperature control system.

4. The automated charge preparation method of claim 1 further comprising the steps of:
   f) establishing a cell history for the plurality of intercoupled energy storage elements; and
   g) adjusting said energy transfer rates responsive to said cell history.

5. The automated charge preparation method of claim 1 wherein said determining step (b) includes accessing a memory, responsive to a current one set of said periodic sets of critical parameters, to retrieve an optimum riskless energy transfer rate and wherein said charging step (d) includes setting said second energy transfer rate equal to said optimum riskless energy transfer rate.

6. The automated charge preparation method of claim 5 further comprising the steps of:
   f) establishing a cell history for the plurality of intercoupled energy storage elements; and
   g) adjusting said energy transfer rates responsive to said cell history.

7. An automated charge preparation method for a plurality of intercoupled energy storage elements having a risk responsive to application of a first charging process to the plurality of intercoupled energy storage elements under a set of predefined conditions, the method comprising the steps of:
   (a) determining periodically, using a microprocessor, a periodic set of critical parameters for the set of predefined conditions of the plurality of intercoupled energy storage elements;
   (b) determining periodically, using the microprocessor and responsive to an evaluation of said periodic set of critical parameters, whether the first charging process may be applied to the plurality of intercoupled energy storage elements without the risk; and thereafter
   (c) charging the plurality of intercoupled energy storage elements using the first charging process whenever said determining step b) determines that the first charging process may be applied to the plurality of intercoupled energy storage elements without the risk;
   (d) charging the plurality of intercoupled energy storage elements using a second charging process that may be applied to the plurality of intercoupled energy storage elements without the risk whenever said determining step b) does not determine that the first charging process may be applied to the plurality of intercoupled energy storage elements without the risk;
e) establishing a cell history for the plurality of intercoupled energy storage elements; and
f) adjusting said energy transfer rates responsive to said cell history;
wherein said second charging process has a second energy transfer rate slower than a first energy transfer rate associated with the first charging process; and
wherein said second charging process dynamically scales said second energy transfer rate responsive to said periodic set of critical parameters.

8. An automated charge preparation apparatus charging a plurality of intercoupled energy storage elements having a risk responsive to application of a first charging process to the plurality of intercoupled energy storage elements under a set of predefined conditions comprising:
a critical parameter acquisition system determining a periodic set of critical parameters for the set of predefined conditions of the plurality of intercoupled energy storage elements;
a controller evaluating said periodic set of critical parameters and determining, responsive to said evaluation, whether the first charging process may be applied to the plurality of intercoupled energy storage elements without the risk;
a charging system, coupled to the plurality of intercoupled energy storage elements, charging the plurality of intercoupled energy storage elements using the first charging process whenever said controller determines that the first charging process may be applied to the plurality of intercoupled energy storage elements without the risk;
otherwise charging the plurality of intercoupled energy storage elements using a second charging process that may be applied to the plurality of intercoupled energy storage elements without the risk whenever said controller does not determine that the first charging process may be applied to the plurality of intercoupled energy storage elements without the risk; and
a temperature control system coupled to the plurality of energy storage elements;
wherein said controller operates said temperature control system to heat the plurality of energy storage elements whenever said second charging process is applied to the plurality of energy storage elements;
wherein said second charging process has a second energy transfer rate slower than a first energy transfer rate associated with the first charging process; and
wherein said controller dynamically scales said second energy transfer rate responsive to said periodic set of critical parameters.

9. The automated charge preparation apparatus of claim 8 wherein the risk includes lithium-plating, wherein the set of predefined conditions include both a state of charge (SOC) and a temperature of one or more elements of the plurality of energy storage elements, and wherein said critical parameter acquisition system includes one or more temperature sensors coupled to the plurality of energy storage elements.

10. The automated charge preparation apparatus of claim 8 wherein said controller further comprises a memory storing data relating specific values for said periodic sets of critical parameters to an optimum riskless energy transfer rate for the specific values;
wherein said controller accesses said memory, responsive to a current one set of said periodic sets of critical parameters, to retrieve said optimum riskless energy transfer rate for the specific values and wherein said controller sets said second energy transfer rate equal to said optimum riskless energy transfer rate.

11. The automated charge preparation apparatus of claim 8 wherein said controller establishes a cell history for the plurality of intercoupled energy storage elements; and adjusts said energy transfer rates responsive to said cell history.

12. The automated charge preparation apparatus of claim 10 wherein said controller establishes a cell history for the plurality of intercoupled energy storage elements and adjusts said energy transfer rates responsive to said cell history.

13. An automated charge preparation apparatus charging a plurality of intercoupled energy storage elements having a risk responsive to application of a first charging process to the plurality of intercoupled energy storage elements under a set of predefined conditions comprising:
a critical parameter acquisition system determining a periodic set of critical parameters for the set of predefined conditions of the plurality of intercoupled energy storage elements;
a controller evaluating said periodic set of critical parameters and determining, responsive to said evaluation, whether the first charging process may be applied to the plurality of intercoupled energy storage elements without the risk;
a charging system, coupled to the plurality of intercoupled energy storage elements, charging the plurality of intercoupled energy storage elements using the first charging process whenever said controller determines that the first charging process may be applied to the plurality of intercoupled energy storage elements without the risk;
otherwise charging the plurality of intercoupled energy storage elements using a second charging process that may be applied to the plurality of intercoupled energy storage elements without the risk whenever said controller does not determine that the first charging process may be applied to the plurality of intercoupled energy storage elements without the risk; and
wherein said second charging process has a second energy transfer rate slower than a first energy transfer rate associated with the first charging process;
wherein said controller dynamically scales said second energy transfer rate responsive to said periodic set of critical parameters; and
wherein said controller establishes a cell history for the plurality of intercoupled energy storage elements and adjusts said energy transfer rates responsive to said cell history.

* * * * *